May 13, 1930. J. P. STAPEL 1,758,014
MANURE LOADER
Filed April 25, 1928 2 Sheets-Sheet 1
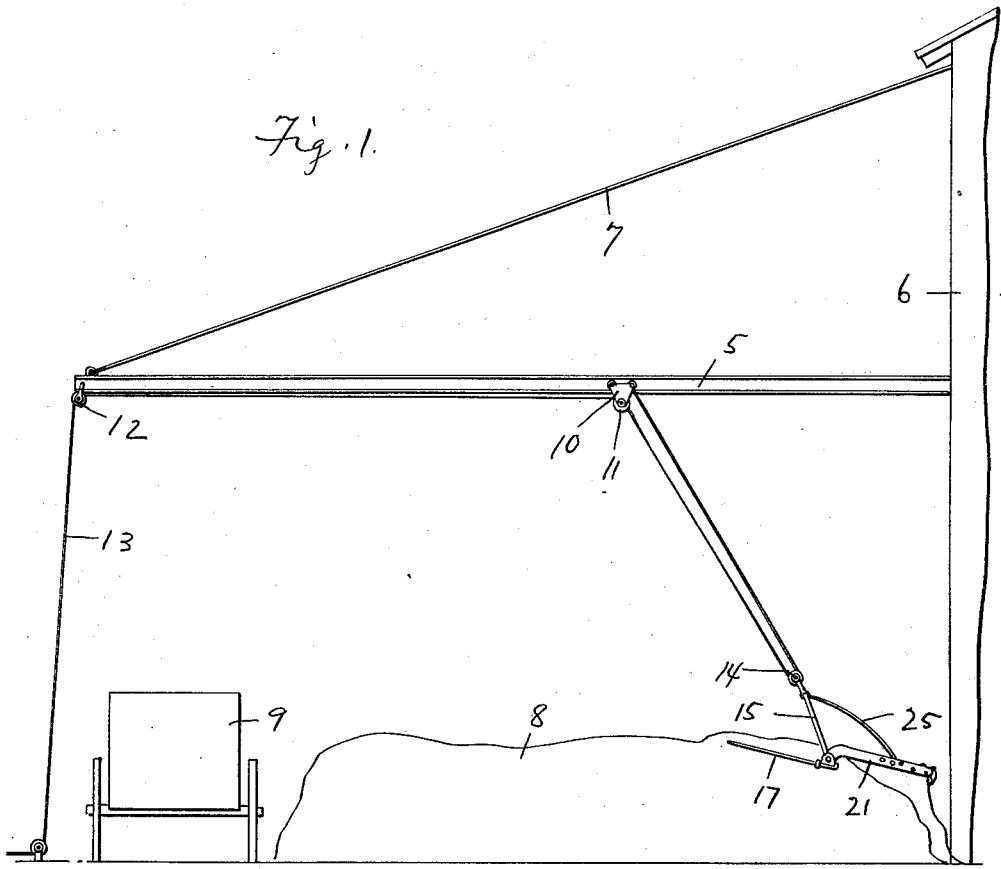
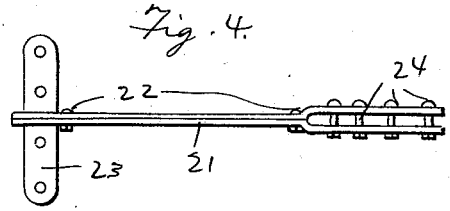
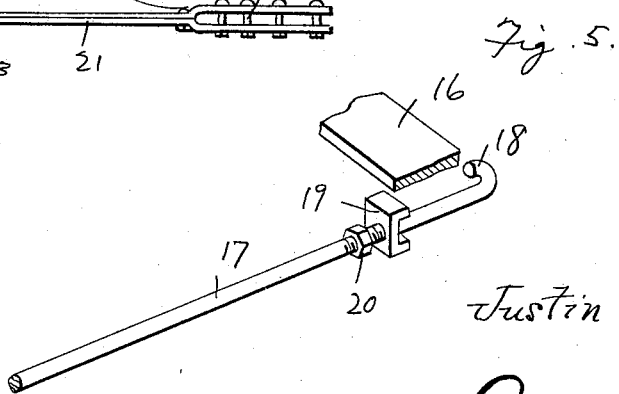
Inventor
Justin P. Stapel
By Clarence A. O'Brien
Attorney

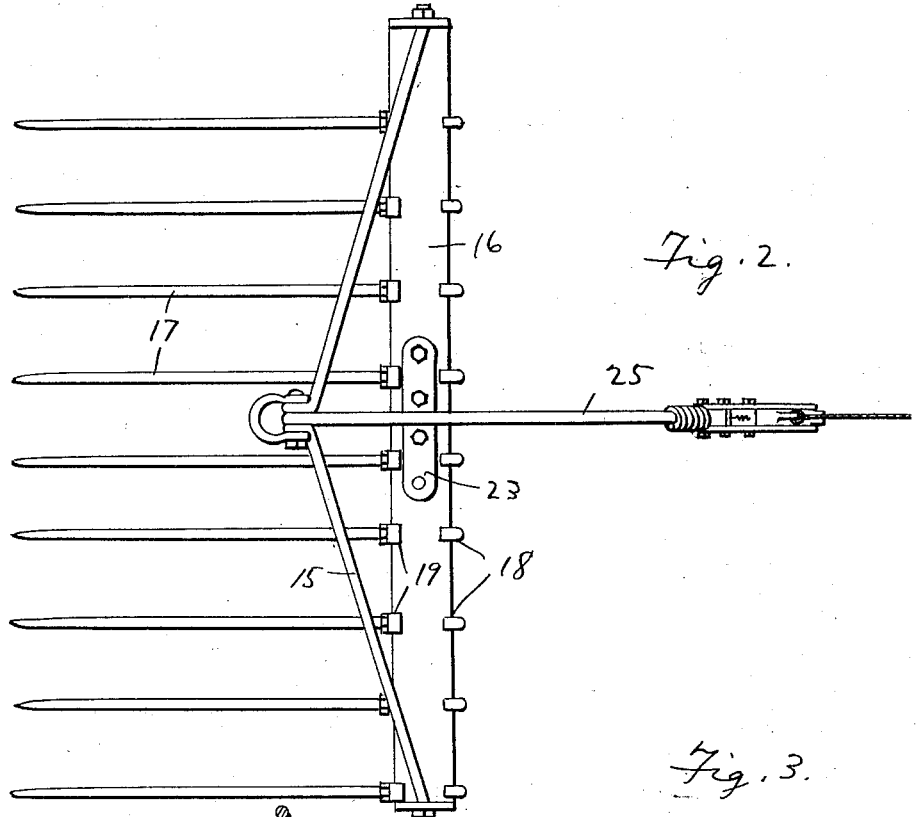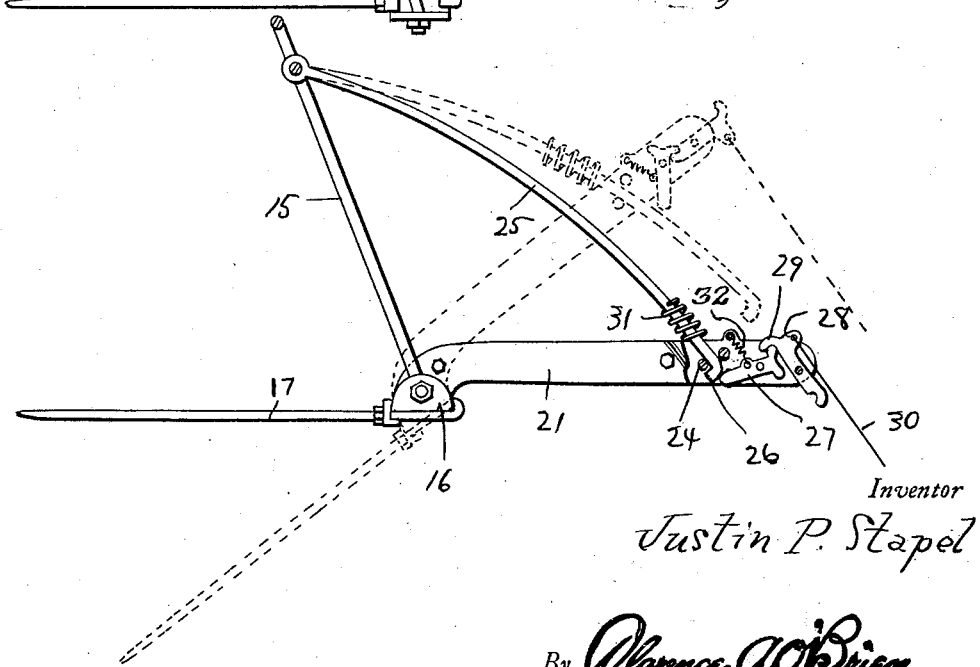

Patented May 13, 1930

1,758,014

UNITED STATES PATENT OFFICE

JUSTIN P. STAPEL, OF OWEN, WISCONSIN

MANURE LOADER

Application filed April 25, 1928. Serial No. 272,778.

The present invention relates to loading devices and has for an object to provide a device of this character adapted particularly for the loading of loose material, such as manure, into a manure spreader or similar formed implement and includes means for loading material from a pile on the ground upwardly and in a direction toward the spreader or other vehicle by means of which the same is transported for a desired purpose.

A further object of the invention is to provide means for maintaining the loader in a position for conveying the material from the pile to the vehicle and including trip means adapted through the operation thereof to deposit the material from the loader into said vehicle.

A still further object is to provide an apparatus of this character of a simple and practical construction, which is strong and durable, efficient and reliable in performance, which facilitates the loading of the material in the vehicle relatively inexpensive to manufacture and install in operative position and otherwise well adapted for the purposes for which the same is intended.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

In the drawings:

Figure 1 is a view in elevation showing the loader in position for operation,

Figure 2 is a top plan view of the loading fork,

Figure 3 is a side elevational view of the fork,

Figure 4 is a detail of the latch arm for the fork whereby to control the fork while in its conveying and depositing position, and Figure 5 is a fragmentary perspective view of the attaching end of one of the fork tines.

Referring now to the drawing in detail, the invention contemplates the provision of a track 5 extending outwardly from the side of a barn 6 or other farm building with the outer end of the track supported in horizontal position by a brace 7 attached to the barn.

The track 5 is disposed immediately above a stack of quantity of the material 8 which is intended for loading into a vehicle 9, such as for instance a manure spreader or the like, the track being of any suitable construction and arranged for mounting a trolley 10 thereon for travelling upon said track.

The trolley is provided with a pulley wheel 11 and a similar pulley 12 is attached at the outer end of the track with a cable 13 extending from said trolley over the pulleys and outwardly therefrom with the outer end of the cable attached to any suitable pulling mechanism for pulling the trolley outwardly toward the outer end of the track in a manner more fully hereinafter explained.

The cable 13 also extends over a pulley 14 mounted on the bail 15 forming a part of the loader as clearly illustrated in Figure 1 of the drawings. The bail 15 has its opposite ends attached to the ends of a fork frame 16 to which a plurality of fork tines 17 are also attached at one end in spaced parallel relation. The attaching ends of the tines 17 formed into a hook 18 for engagement with the frame member 16, each of said tines also carrying a clamping member 19 cooperating with the hook for attaching the tine to said frame member and fixedly secured in attached position by a nut 20 threadedly mounted on the tines.

The outer ends of the tines are disposed longitudinally with respect to the track 5 and extend in a direction toward the outer end thereof so that the same may be forced into the material for picking up the same and conveying the material toward the vehicle 9.

Intermediate the ends of the fork frame 16 is attached one end of a latch arm 21, said latch arm being formed of a pair of separate members as more clearly illustrated in Figure 4 of the drawings, said members being secured to each other by bolts 22 and with one end of each of said members formed into an attaching plate 23 for securing the fork frame 16 and the opposite ends of said members offset and disposed in spaced parallel relation with a plurality of pins 24 extending transversely therebetween.

Extending between the spaced end of the latch arm 21 is one end of a trip rod 25 having a hook 26 formed thereon for engagement with one of the pins 24 and with the opposite end of said rod attached to the bail 15 of the loader.

Another of said pins 24 provides pivotal mounting for a trip 27 having one end engageable with the hooked end 26 of the rod 25 and retained in such position by a spring 28 connecting one end of the trip with the arm 21. A trigger 32 is also pivotally mounted on one of the pins 24 with one end of the trigger formed into a hook 29 engageable with the trip 27 for retaining the same in engaged position with the rod 25.

To the trigger 28 is also attached a trigger operating cord 30 adapted to actuate the trigger for releasing the trip 27 for the engagement thereof with the rod 25 whereby to release the latch arm 21, from the rod 25 and permit the forward end of the loader to swing downwardly for depositing the material within the vehicle 9 after the same has been moved into position with respect thereto through the operation of the cable 13.

In this manner the material may be loaded upon the tines 17 of the loader and upon the pulling on the cable 13 will cause the loader to move upwardly and toward the outer end of the track 5 into a position immediately above the vehicle 9. Upon the operation of the trip mechanism the weight of the material will cause the tines 17 to tilt downwardly and accordingly the material will be deposited in the vehicle.

A coil spring 31 is arranged on the rod 25 above the latch arm 21 so as to operate as a buffer for preventing the latch arm 21 from striking the bail 15 during the upward movement of the latch arm upon the releasing of the trip mechanism as shown by the dotted lines in Figure 3 of the drawings. As soon as the load of material has been deposited in the vehicle 9 the loader is returned to its original position as shown by the full lines in Figure 3 of the drawing and the loading operation may then continue.

It is obvious that my invention is susceptible to various changes and modification in construction without departing from the spirit of the invention or the scope of the appended claim, and I accordingly claim all such forms of the device to which I am entitled.

Having thus described my invention, what I claim as new is:

A cable supported loader of the class described, comprising a fork frame composed of a transverse frame member having a plurality of tines extending from one side thereof, a bifurcated latch arm extending from the opposite side thereof, in a plane parallel with the tines and rigidly connected thereto, longitudinally spaced pins extending transversely through the furcations on the arms, a bail attached at the ends of the transverse frame member, a trip rod pivotally attached at one end to an intermediate portion of the bail and having its free end slidably extended through certain of the pins between the bifurcated arm ends and terminating in an angularly turned stop portion for engagement with one of the pins, and a trip device carried by the latch arm and releasably engageable with the adjacent end of said trip rod whereby to prevent the upward swinging movement of the latch arm by the load supported on the tines, said trip device comprising a pivoted trip member having one end engageable with the free end of the trip rod and a pivoted trigger having its opposite ends oppositely engageable with the trip member for moving the same into latch rod releasing and retaining position.

In testimony whereof I affix my signature.

JUSTIN P. STAPEL.